United States Patent [19]
Chen

[11] Patent Number: 5,617,607
[45] Date of Patent: Apr. 8, 1997

[54] WINDSHIELD WIPER ASSEMBLY

[76] Inventor: Liang-Yuan Chen, No. 180, Hsinmin St., Tamshui, Taipei Hsien, Taiwan

[21] Appl. No.: 518,293

[22] Filed: Aug. 15, 1995

[51] Int. Cl.$^6$ ................... B60S 1/40; B60S 1/38
[52] U.S. Cl. ................ 15/250.201; 15/250.44; 15/250.32
[58] Field of Search ........... 15/250.201, 250.32, 15/250.46, 250.44, 250.351, 250.361, 250.4, 250.41, 250.451, 250.452, 250.453

[56] References Cited

U.S. PATENT DOCUMENTS

| | | | |
|---|---|---|---|
| 3,234,578 | 2/1966 | Golub et al. | 15/250.201 |
| 3,864,783 | 2/1975 | Arman | 15/250.32 |
| 4,244,077 | 1/1981 | Harbison et al. | 15/250.44 |
| 4,389,746 | 6/1983 | Kimber | 15/250.32 |
| 4,578,839 | 4/1986 | Nishikawa | 15/250.32 |
| 4,675,934 | 6/1987 | Dal Palu | 15/250.44 |
| 4,741,071 | 5/1988 | Bauer et al. | 15/250.201 |
| 5,065,474 | 11/1991 | Charng | 15/250.32 |
| 5,093,954 | 3/1992 | Kuzuno | 15/250.201 |
| 5,311,636 | 5/1994 | Lee | 15/250.201 |

FOREIGN PATENT DOCUMENTS 8679  8/1990  WIPO ................ 15/250.44

*Primary Examiner*—Gary K. Graham
*Attorney, Agent, or Firm*—Alfred Lei

[57] ABSTRACT

A rubber blade assembly for a windshield wiper, including a casing, two master blade holders pivoted to the casing to hold two assistant blade holders and a rubber blade, wherein the casing has a cowling which protects the rubber blade against the radiation of sunlight and gives a downward pressure to the rubber blade against the windshield upon the bearing of the force of thy wind, an elongated mounting slot longitudinally disposed at the cowling in the middle for mounting a connector, which connects the casing to a wiper drive arm, a plurality of circular recesses at two opposite ends of the cowling for bearing the force of thy wind, and a transverse pivot hole in the middle below the cowling and connected between two opposite pivots holes of the connector by pivot means.

1 Claim, 5 Drawing Sheets

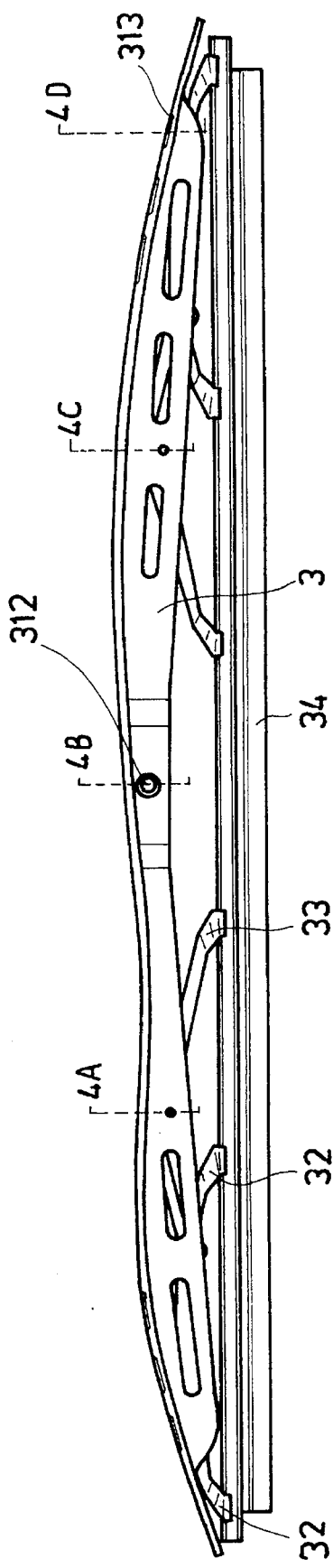
FIG. 4
FIG. 4A  FIG. 4B  FIG. 4C  FIG. 4D

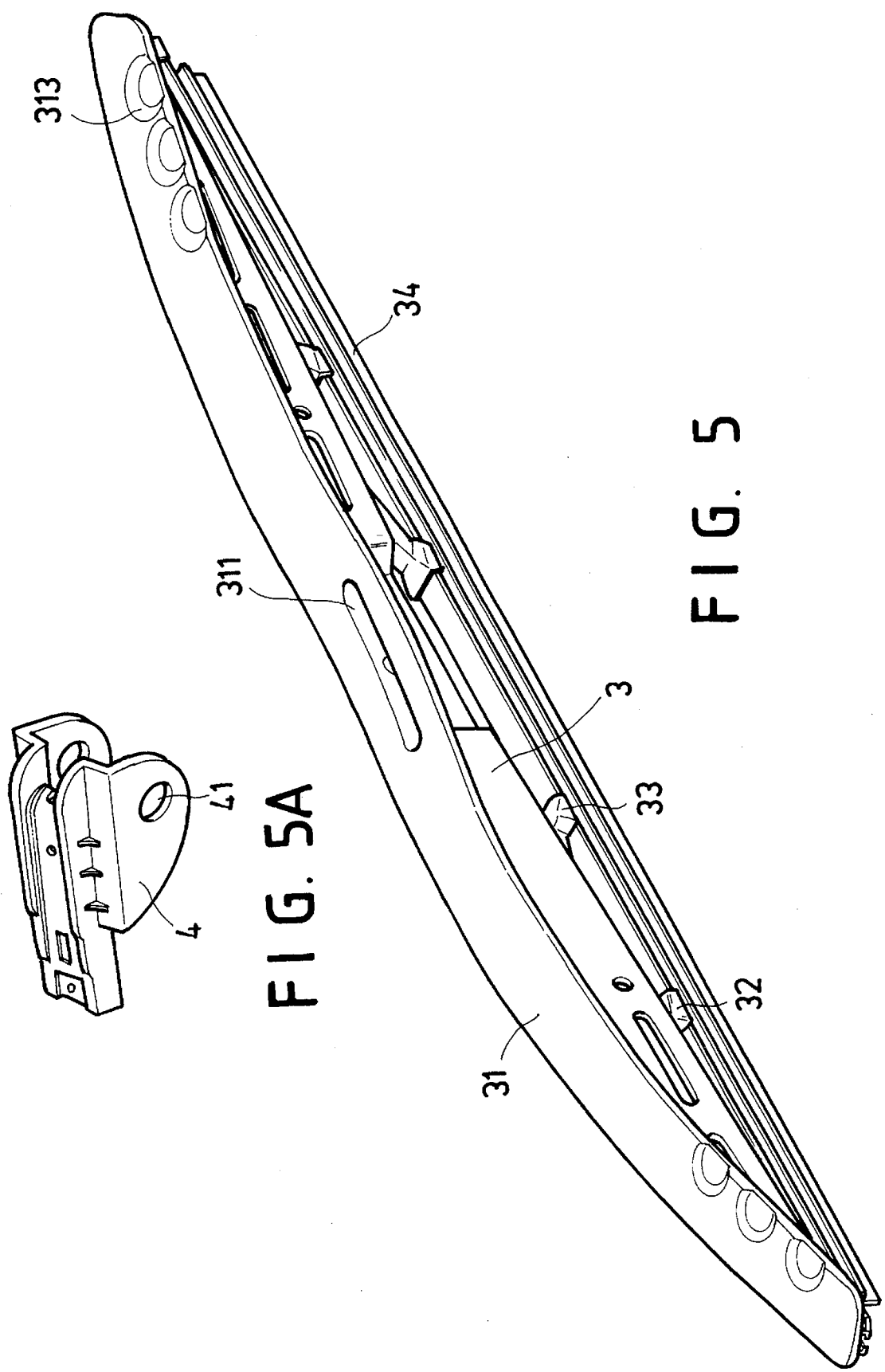

WINDSHIELD WIPER ASSEMBLY

BACKGROUND OF THE INVENTION

1. Field of the Invention

The present invention relates to windshield wipers, and relates more particularly to a rubber blade assembly for windshield wipers which has a cowling that protects the rubber blade against the radiation of sunlight and gives a downward pressure to the rubber blade against the windshield upon the bearing of the force of thy wind.

2. Description of the Prior Art

FIG. 1 shows a rubber blade assembly for windshield wipers according to the prior art which comprises an arched casing 11 for connection to the wiper drive arm, a rubber blade 14, two assistant blade holders 13 fastened to the top side of the rubber blade 14 in the middle, and two master blade holders 12 pivoted to two opposite ends of the arched casing 11 and connected between two opposite ends of the rubber blade 14 and the two assistant blade holders 13. This structure of rubber blade assembly is still not satisfactory in function. When in use, the side wall of the arched casing 11 will bears the force of thy wind. When the force of the wind increases, the arched arched casing 11 tends to be forced to vibrate the rubber blade 14. When the rubber blade 14 is vibrated, it cannot remove rain water from the windshield effectively. FIG. 2 shows another structure of rubber blade assembly for windshield wipers which is also comprised an arched casing 21 for connection to the wiper drive arm, a rubber blade 24, two assistant blade holders 23 fastened to the top side of the rubber blade 24 in the middle, and two master blade holders 22 pivoted to two opposite ends of the arched casing 21 and connected between two opposite ends of the rubber blade 24 and the two assistant blade holders 23. The rubber blade assembly of FIG. 2 is similar to that shown in FIG. 1, however the shape of the arched casing 11 of FIG. 1 is different from that shown in FIG. 2. Therefore, the rubber blade assembly of FIG. 2 cannot eliminate the drawback of that shown in FIG. 1. Further more, because the rubber blades 14 and 24 of both rubber blade assemblies are exposed to the radiation of sunlight, these two rubber blade assemblies are not durable in use.

SUMMARY OF THE INVENTION

This invention relates to a rubber blade assembly for windshield wipers which eliminates the aforesaid drawbacks.

According to the preferred embodiment of the present invention, the rubber blade assembly comprises a casing, two master blade holders pivoted to the casing to hold two assistant blade holders and a rubber blade, wherein the casing has a cowling which protects the rubber blade against the radiation of sunlight and gives a downward pressure to the rubber blade against the windshield upon the bearing of the force of thy wind, an elongated mounting slot longitudinally disposed at the cowling in the middle for mounting a connector, which connects the casing to a wiper drive arm, a plurality of circular recesses at two opposite ends of the cowling for bearing the force of the wind, and a transverse pivot hole in the middle below the cowling and connected between two opposite pivots holes of the connector by pivot means.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

BRIEF DESCRIPTION OF THE DRAWINGS

FIG. 4 is a longitudinal view in section of the rubber blade assembly shown in FIG. 3;

FIG. 4A is a sectional view taken along line 4A—4A of FIG. 4;

FIG. 4B is a sectional view taken along line 4B—4B of FIG. 4;

FIG. 4C is a sectional view taken along line 4C—4C of FIG. 4;

FIG. 4D is a sectional view taken along line 4D—4D of FIG. 4;

FIG. 5 is a perspective view of the present invention; and

FIG. 5A is a perspective view of the connector.

DETAILED DESCRIPTION OF THE PREFERRED EMBODIMENT

Figure 1:
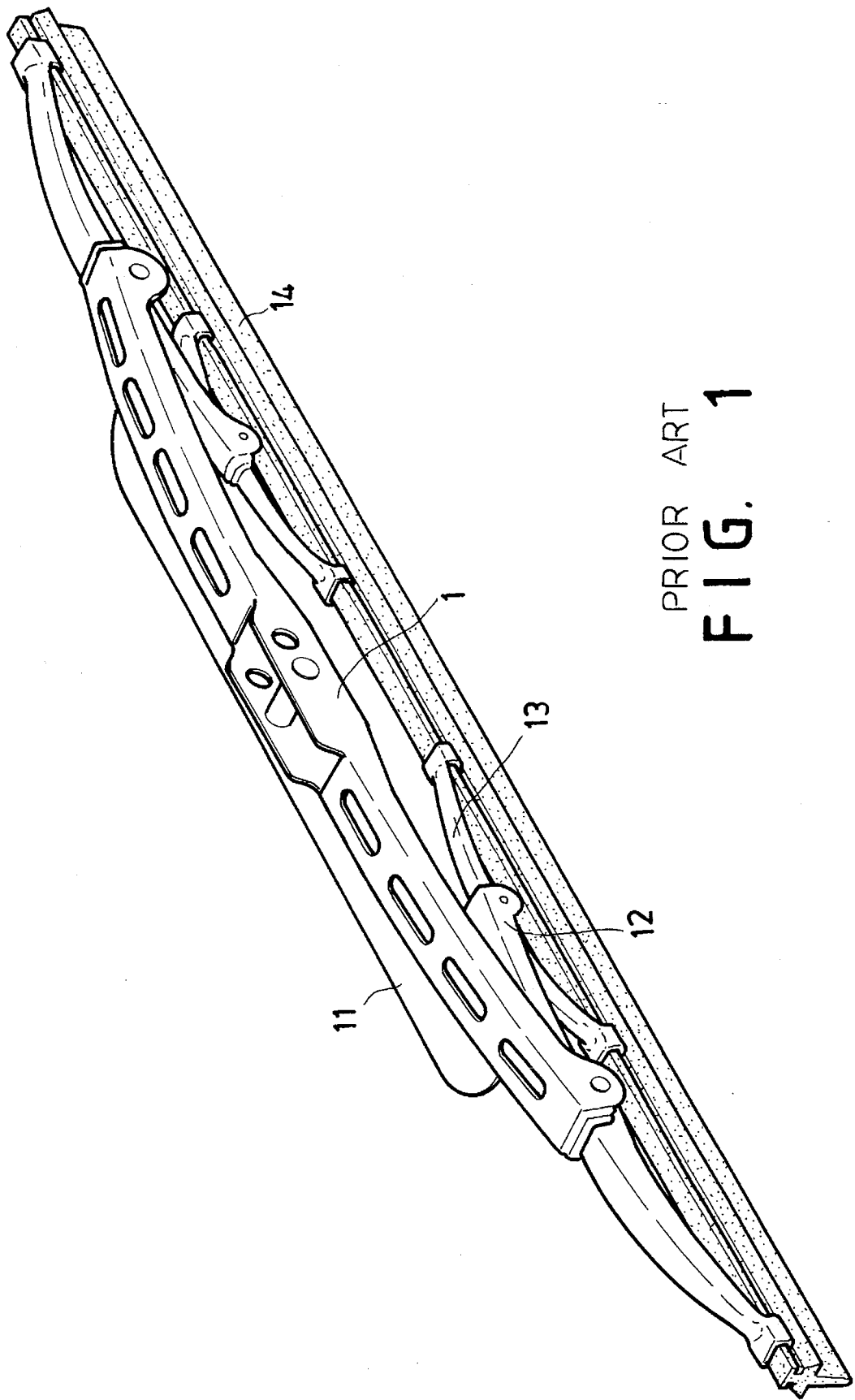
FIG. 1 shows a rubber blade assembly for windshield wipers according to the prior art.
Figure 2:
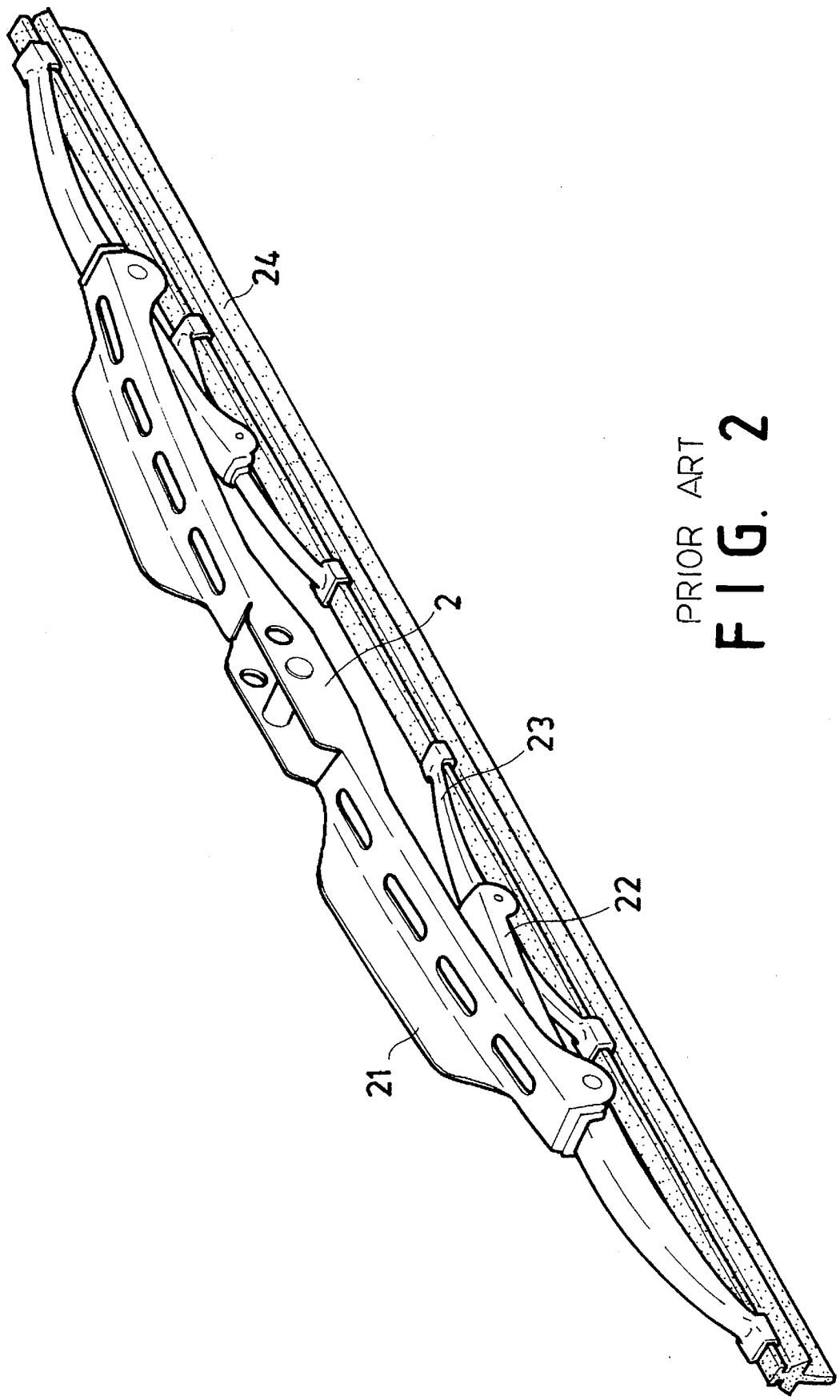
FIG. 2 shows another structure of rubber blade assembly for windshield wipers according to the prior art.

For purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 3:
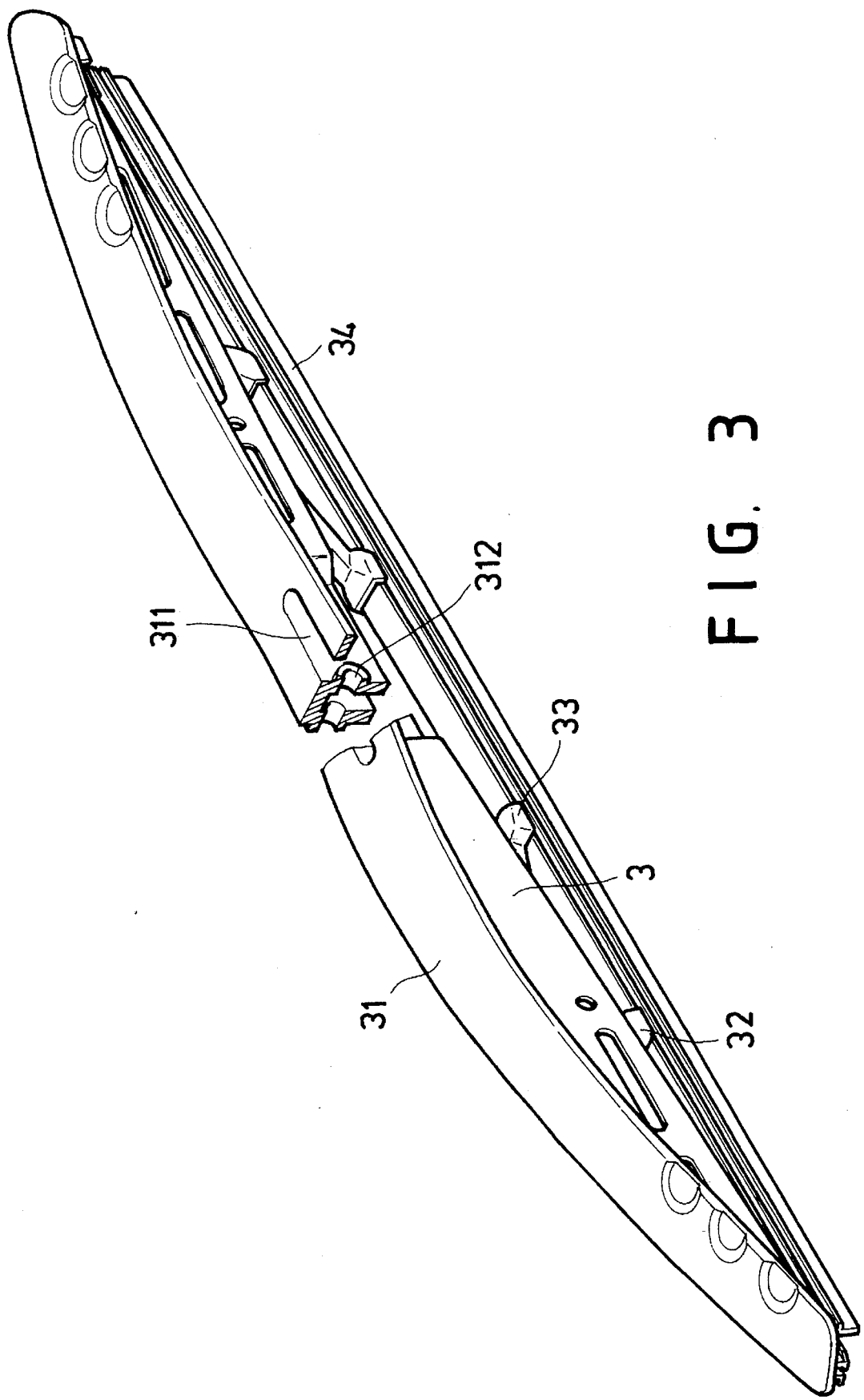
FIG. 3 is an elevational view and partially cut away of a rubber blade assembly for windshield wipers according to the present invention.

Referring to FIG. 3, the rubber blade, referenced by 34, is fastened to two master blade holders 33, which are fastened to the top side of the rubber blade 34 in the middle, and two assistant blade holders 32, which are fastened to the master blade holders 33 to hold two opposite ends of the rubber blade 34. A casing 3 is provided to hold the master blade holders 33 and to protect the rubber blade 34 against the radiation of sunlight.

Referring to FIG. 5 and FIG. 3 again, the casing 3 comprises a cowling 31 which gives a downward pressure to the rubber blade 34 against the windshield when bears the force of the wind, an elongated mounting slot 311 longitudinally disposed at the cowling 31 in the middle for mounting a connector 4 (see FIG. 5A), a plurality of substantially arcuate recesses 313 at the top side of the cowling 31 near two opposite ends for bearing the force of the wind, a transverse pivot hole 312 in the middle below the elongated mounting slot 311 for connection between the two opposite pivot holes 41 of the connector 4. The connector 4 connects the the casing 3 to the wiper drive arm (not shown).

Referring to FIGS. from 4, 4A, 4B, 4C and 4D and FIG. 5 again, the transverse pivot hole 312 is made through two opposite vertical side walls of the casing 3 below the cowling 31 for mounting the connector 4 (see FIG. 4B). Each side wall includes a shoulder extending therefrom, surrounding said transverse pivot hole. The shoulders are adapted to be received into the pivot hole in said connector 4. FIGS. 4A and 4C show the cross sections of the areas of the casing 3 to which the master blade holder 33 is connected. FIG. 4D is a sectional view of one end of the casing 3 showing the location of the respective substantially arcuate recesses 313. When the car is moving, the substantially arcuate recesses 313 bear the force of the wind to give a downward pressure to the rubber blade 34 against the windshield. Furthermore, the casing 3 and the cowling 31 protect the rubber blade 34 against weather, the service life of the rubber blade 34 is prolonged.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A windshield wiper blade assembly comprising:

an elongated casing defining first and second ends, said casing is of substantially U-shaped transverse cross section defining two substantially parallel side walls, said side walls each having inner and outer surfaces wherein said inner surfaces face one another, said casing further includes a top wall which connects said side walls and extends laterally outwardly away from said casing past at least one outer surface to define a free edge, said top wall thereby defining an elongated cowling for interacting with air flow across the assembly, the cowling includes first and second ends and, intermediate said ends of the cowling, a longitudinally extending elongated slot therein, and the casing includes, intermediate said ends of the casing, a pair of aligned pivot holes in the side walls, each side wall includes a shoulder projecting from said outer surfaces surrounding said pivot hole therein, said cowling further includes a plurality of arcuate recesses therein at each end thereof extending into said free edge;

a master blade holder pivotally attached to said casing adjacent each end thereof;

an assistant blade holder pivotally attached to each master blade holder;

an elongated rubber blade supported by each of said master blade holders and said assistant blade holders, said rubber blade adapted to engage a windshield;

a connector adapted to connect said casing with a wiper arm, said connector comprising a substantially U-shaped member including a pair of spaced side walls, each side wall includes an aperture therethrough, said connector is coupled with said casing wherein one side wall of said connector is received in said slot and said shoulders are, respectively, received into said apertures;

wherein said recesses receive air flow over the assembly to provide downpressure to said rubber blade against the windshield.

\* \* \* \* \*